(12) United States Patent
Endo et al.

(10) Patent No.: US 9,260,620 B2
(45) Date of Patent: Feb. 16, 2016

(54) NON-AQUEOUS INK

(75) Inventors: Toshihiro Endo, Ibaraki-ken (JP); Tetsuo Hosoya, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 13/881,334

(22) PCT Filed: Oct. 17, 2011

(86) PCT No.: PCT/JP2011/005778
§ 371 (c)(1), (2), (4) Date: Apr. 24, 2013

(87) PCT Pub. No.: WO2012/056644
PCT Pub. Date: May 3, 2012

(65) Prior Publication Data
US 2013/0233203 A1    Sep. 12, 2013

(30) Foreign Application Priority Data

Oct. 27, 2010  (JP) ................. 2010-241112
Feb. 14, 2011  (JP) ................. 2011-028056

(51) Int. Cl.
C09D 11/02     (2014.01)
C09D 11/322    (2014.01)
C09D 11/36     (2014.01)

(52) U.S. Cl.
CPC ............. *C09D 11/36* (2013.01); *C09D 11/322* (2013.01)
USPC ..................................... 106/31.86

(58) Field of Classification Search
CPC ....................................... C09D 11/36
USPC ..................................... 106/31.86
See application file for complete search history.

(56) References Cited

U.S. PATENT DOCUMENTS

| 6,869,986 B1* | 3/2005 | Millot et al. ............... 523/160 |
| 2004/0254265 A1* | 12/2004 | Mizutani et al. ............... 523/160 |
| 2005/0113481 A1* | 5/2005 | Sabys et al. ............... 523/160 |
| 2007/0101901 A1 | 5/2007 | Endo et al. |
| 2007/0173560 A1 | 7/2007 | Uozumi |
| 2011/0012954 A1* | 1/2011 | Brown et al. .............. 347/20 |
| 2011/0064923 A1* | 3/2011 | Grant et al. ............... 428/195.1 |
| 2011/0305880 A1* | 12/2011 | Nakamura et al. ......... 428/195.1 |
| 2012/0170241 A1 | 7/2012 | Nakako et al. |
| 2012/0255460 A1* | 10/2012 | Kawakami et al. ........ 106/31.49 |

FOREIGN PATENT DOCUMENTS

| JP | 05-345872 A | 12/1993 |
| JP | 2002-255528 A | 9/2002 |
| JP | 2002-256168 A | 9/2002 |
| JP | 2002-302629 A | 10/2002 |
| JP | 2006-045450 A | 2/2006 |
| JP | 2007-126564 A | 5/2007 |
| JP | 2007-177160 A | 7/2007 |
| JP | 2007-197500 A | 8/2007 |
| JP | 2009-102480 A | 5/2009 |
| JP | 2009-123674 A | 6/2009 |
| JP | 2011-531917 A | 9/2009 |
| JP | 2011-140598 A | 7/2011 |
| JP | 2011-142052 A | 7/2011 |
| WO | 2011/034019 A1 | 3/2011 |
| WO | 2011/034109 A1 | 3/2011 |

OTHER PUBLICATIONS

International Search Report; PCT/JP2011/005778; Dec. 13, 2011.
Japanese Office Action; JP2011-028056; Nov. 11, 2014 with partial translation.

* cited by examiner

*Primary Examiner* — Veronica F Faison
(74) *Attorney, Agent, or Firm* — Studebaker & Brackett PC

(57) ABSTRACT

[Problem to be solved] A non-aqueous ink, which has excellent pigment dispersion stability and can achieve reduction or elimination of print-through, thereby achieving high print density, is disclosed.

[Solution] The non-aqueous ink contains at least a pigment and an organic solvent, wherein the organic solvent contains a five-membered heterocyclic compound having a C=O bond in an amount of 50 mass % or more of the organic solvent, and the content of a polymer component in the ink is 20 mass % or less relative to the pigment.

11 Claims, No Drawings

NON-AQUEOUS INK

BACKGROUND OF THE INVENTION

1. Field of the Invention

The present invention relates to a non-aqueous ink that is suitable for use with an inkjet recording system, and more particularly to a non-aqueous ink that provides an excellent effect of reducing or eliminating print-through (striking-through), thereby achieving high print density.

2. Description of the Related Art

An inkjet recording system ejects a highly fluid inkjet ink as an ink particle from a very thin head nozzle to record an image on printing paper, which is positioned to face the nozzle. Because of low noise and ability of high-speed printing, the inkjet recording systems are rapidly becoming widely used in recent years. As inks for use with the inkjet recording systems, various types of so-called non-aqueous pigment inks, which are formed by finely dispersing a pigment in a non-water-soluble solvent, are proposed.

For example, the applicant of the present application has proposed, in Japanese Unexamined Patent Publication No. 2007-126564 (hereinafter, Patent Document 1), a non-aqueous ink including a pigment and an organic solvent, which includes an ester solvent, a higher alcohol solvent, a hydrocarbon solvent, etc., and further including a soluble polymeric dispersant. This ink is advantageous in that it has excellent on-machine stability and is suitable for inkjet, and it can provide a printed surface that does not adhere to another printed surface printed with a PPC duplicator or a laser printer even when they are stacked in contact with each other, and thus is highly suitable for toner. Further, Japanese Unexamined Patent Publication No. 2007-197500 (hereinafter, Patent Document 2) discloses a non-aqueous ink including a pigment and an organic solvent, which includes an ester solvent and/or a hydrocarbon solvent, and further including a dispersible polymeric dispersant (NAD).

Conventional pigment-dispersed non-aqueous inks ensure dispersion stability of the pigment by using a resin or polymeric dispersant (soluble dispersant or NAD), as taught in Patent Document 1 or 2, or by directly modifying the surface of the pigment with a polymer (such as by grafting or microencapsulation). These approaches are to physically reduce or eliminate agglomeration of the pigment by providing steric hindrance by the polymer. In other words, these approaches attempt to improve the dispersion stability of the pigment in the ink by adding the polymer component in the ink.

SUMMARY OF THE INVENTION

However, in the case where the polymer component is added in the ink, the pigment tends to penetrate into the printing paper together with the polymer component after the ink is transferred onto the printing paper, because of high affinity between the pigment and the polymer component or bonding between the pigment and the polymer component. This may result in low print density on the surface of the printing paper and print-through of the ink. That is, in the case where the dispersion of the pigment is achieved by using the polymer, an attempt to increase the pigment dispersibility increases tendency of the low print density and the print-through, and an attempt to increase the print density and reduce the print-through decreases the pigment dispersibility, i.e., there is a trade-off between the pigment dispersibility and the reduction of print-through.

In view of the above-described circumstances, the present invention is directed to providing a non-aqueous ink that has excellent pigment dispersion stability and can reduce or eliminate the print-through of the ink, thereby achieving high print density.

An aspect of the non-aqueous ink of the invention is a non-aqueous ink containing at least a pigment and an organic solvent, wherein the organic solvent contains a five-membered heterocyclic compound having a C=O bond in an amount of 50 mass % or more, and a content of a polymer component in the ink is 20 mass % or less relative to the pigment.

It may be preferable that the five-membered heterocyclic compound is at least one selected from a carbonate compound, a lactone compound, an imidazolidinone compound and a pyrrolidone compound.

It may be preferable that the carbonate compound is at least one selected from ethylene carbonate, propylene carbonate, 1,2-butylene carbonate and derivatives thereof.

It may be preferable that the lactone compound is at least one selected from γ-butyrolactone, α-acetyl-γ-butyrolactone, pentano-4-lactone and derivatives thereof.

It may be preferable that the imidazolidinone compound is at least one selected from 2-imidazolidinone, 1,3-dimethyl-2-imidazolidinone, 1,3-diethyl-2-imidazolidinone, 1,3-dipropyl-2-imidazolidinone, 1,3-diisopropyl-2-imidazolidinone, 1,3-dibutyl-2-imidazolidinone and derivatives thereof.

It may be preferable that the pyrrolidone compound is at least one selected from 2-pyrrolidone, N-methyl-pyrrolidone (NMP), 1-ethyl-2-pyrrolidone and derivatives thereof.

It may be preferable that the content of the polymer component in the ink is 5 mass % or less relative to the pigment.

It may be more preferable that the ink contains substantially no polymer component.

It may be preferable that a content of the cyclic compound is 60 to 97 mass % relative to the total amount of the ink.

It may be preferable that the pigment is carbon black subjected to an acidic treatment.

The non-aqueous ink of the invention contains a five-membered heterocyclic compound having a C=O bond in an amount of 50 mass % or more of the organic solvent. Therefore, even the ink contains a polymer component, which provides high pigment dispersibility, in an amount of 20 mass % or less relative to the pigment, both the pigment dispersion stability and the reduction or elimination of print-through can be achieved, and the improved reduction or elimination of print-through provides a non-aqueous ink that achieves high print density.

DESCRIPTION OF THE PREFERRED EMBODIMENTS

A non-aqueous ink of the invention is a non-aqueous ink (which may hereinafter simply be referred to as "ink") containing at least a pigment and an organic solvent, wherein the organic solvent contains a five-membered heterocyclic compound having a C=O bond (which may hereinafter simply be referred to as "five-membered heterocyclic compound") in an amount of 50 mass % or more of the organic solvent, and the content of a polymer component in the ink is 20 mass % or less relative to the pigment.

The five-membered heterocyclic compound may be liquid or solid. As a solid five-membered heterocyclic compound, one that dissolves in an organic solvent is used. As the organic solvent, in which the five-membered heterocyclic compound is dissolved, the later-described organic solvents can be used. Preferred examples of the five-membered heterocyclic compound may include a carbonate compound, a lactone compound, an imidazolidinone compound and a pyrrolidone compound.

Preferred examples of the carbonate compound may include ethylene carbonate, propylene carbonate, 1,2-butylene carbonate and derivatives thereof.

Preferred examples of the lactone compound may include γ-butyrolactone, α-acetyl-γ-butyrolactone, pentano-4-lactone and derivatives thereof.

Preferred examples of the imidazolidinone compound may include 2-imidazolidinone, 1,3-dimethyl-2-imidazolidinone, 1,3-diethyl-2-imidazolidinone, 1,3-dipropyl-2-imidazolidinone, 1,3-diisopropyl-2-imidazolidinone, 1,3-dibutyl-2-imidazolidinone and derivatives thereof.

Preferred examples of the pyrrolidone compound may include 2-pyrrolidone, N-methyl-pyrrolidone, 1-ethyl-2-pyrrolidone and derivatives thereof.

Examples of the derivatives may include compounds in which a hydrogen atom is substituted with a fluorine atom or an alkyl group with a carbon number of 1 to 4.

The five-membered heterocyclic compounds may be used singly or in combination of two or more species, as appropriate. If two or more species are used in combination, the total amount of the five-membered heterocyclic compounds used in combination is 50 mass % or more relative to the total amount of the organic solvent. It is more preferable that the content of the five-membered heterocyclic compound is 60 to 97 mass % relative to the total amount of the ink.

Usual inks need to contain a polymer component, such as a dispersant or a resin, in an amount of about 0.5 to 30 mass % relative to the total amount of the ink (about 30 to 200 mass % relative to the pigment) in order to achieve good dispersibility of the pigment. However, the ink of the invention can achieve good dispersibility of the pigment with the five-membered heterocyclic compound, and therefore can ensure sufficient pigment dispersion stability even when the content of the polymer component is 20 mass % or less relative to the pigment. Since the five-membered heterocyclic compound has weaker affinity to the pigment than the polymer, the five-membered heterocyclic compound does not drag the pigment when it penetrates into printing paper after the ink is transferred onto the printing paper, which is the case when the polymer is contained in the ink. Therefore, the ink of the invention produces almost no print-through, and can achieve printing with high density as a result.

The content of the polymer component in the ink is 20 mass % or less, or preferably 5 mass % or less relative to the pigment. It is more preferable that substantially no polymer component is contained in the ink. The description "substantially no polymer component is contained" refers to a case where no polymer component is contained, and also to a case where, for example, a polymer component is contained as inevitable impurities.

The polymer component may include one that is intentionally added to the ink, such as a polymeric dispersant or a resin, and one that may be originally contained in a pigment. In the case where a polymeric dispersant is contained as the polymer component in the ink, examples of commercially-available polymer components may include SOLSPERSE series (SOLSPERSE 20000, 27000, 41000, 41090, 43000, 44000) available from The Lubrizol Corporation, JONCRYL series (JONCRYL 57, 60, 62, 63, 71, 501) available from BASF JAPAN LTD., polyvinylpyrrolidone K-30, K-90, available from Dai-Ichi Kogyo Seiyaku Co., Ltd., etc.

In the case where a resin is contained as the polymer component, examples of the resin may include: maleic resins, such as MALKYD NO. 31, NO. 32, NO. 33 and MALKYD NOS. 32 to 30WS available from Arakawa Chemical Industries, Ltd.; phenol resins, such as TAMANORI 751 and TAMANOL PA available from Arakawa Chemical Industries, Ltd.; styrene acrylic resins, such as JONCRYL 682 (trade name) available from BASF Japan Ltd.; ketone resins, such as HILAC 111 and 110H available from Hitachi Chemical Co., Ltd.; coumarone resins, such as ESCRON G90 and V120 available from Nippon Steel Chemical Co., Ltd.; polyvinyl formal resins, such as VINYLEC TYPE-E and TYPE-K available from Chisso Corporation; ε-caprolactam copolymers, such as NYLON 6 available from Ube Industries, Ltd.; polyvinyl butyral resins, such as ESLEC BL-1 and BL-2 available from Sekisui Chemical Co., Ltd.; polystyrenes, such as STYLAC-AS767 available from Asahi Kasei Corporation; polyacrylic acid esters, such as methyl polyacrylate; polymethacrylic acid esters, such as methyl polymethacrylate and propyl polymethacrylate; addition polymer resins, such as chlorinated polypropylene, polyvinyl acetate and maleic anhydride polymer; and condensation polymer resins, such as acrylonitrile-butadiene-styrene resin, chlorinated polypropylene, DFK resin, polyester, polyurethane and polyamide.

The organic solvent contained in the ink of the invention may totally consist of the five-membered heterocyclic compound, or may include another organic solvent. Examples of the organic solvent other than the five-membered heterocyclic compound may include water-soluble organic solvents. Specific examples of the water-soluble organic solvents may include glycols, such as ethylene glycol, diethylene glycol, triethylene glycol, tetraethylene glycol, pentaethylene glycol, propylene glycol, dipropylene glycol and tripropylene glycol, glycerin, acetins, glycol derivatives, such as triethylene glycol monomethyl ether, triethylene glycol monobutyl ether, tetraethylene glycol monomethyl ether, tetraethylene glycol dimethyl ether and tetraethylene glycol diethyl ether, triethanolamine, 1-methyl-2-pyrrolidone, β-thioglycol and sulfolane. These water-soluble organic solvents may be used singly or in combination of two or more species.

The content of the water-soluble organic solvent may preferably be 40 mass % or less relative to the total amount of the ink, in view of the pigment dispersion stability and the reduction or elimination of print-through.

The ink of the invention may use conventionally known inorganic and organic pigments, as appropriate. Examples of the inorganic pigment may include titanium oxide, colcothar, cobalt blue, ultramarine, iron blue, carbon black, calcium carbonate, kaolin, clay, barium sulfate, talc and silica. Examples of the organic pigment may include insoluble azo pigment, azo lake pigment, condensed azo pigment, condensed polycyclic pigment and copper phthalocyanine pigment. These pigments may be used singly or in combination, as appropriate. The addition amount of the pigment may preferably be in the range from 0.5 to 20 mass % relative to the total amount of ink.

The pigment may preferably be acidic. In other words, the pigment may preferably have many polar functional groups, such as carboxylic group, sulfonic group or hydroxyl group, at the surface thereof. This type of pigment facilitates ensuring the dispersion stability. For example, with respect to the carbon black, an acidic carbon black or a neutral carbon black subjected to an acidic treatment with a pH of pigment washing water of 4.0 or less is preferred. The pH of the pigment washing water is measured according to the JIS standard K5101-17-1. Specific examples of preferred acidic pigments may include carbon black MA100, MA11, MA8 and MA7 (available from Mitsubishi Chemical Corporation), RAVEN 1040 and RAVEN 1255 (available from Columbian), REGAL 400 (available from Cabot), CYANIN BLUE KRG and CYANIN BLUE 4044 (available from Sanyo Color Works, Ltd.), BRILLIANT CARMINE 6B-321 and SUPER RED BN (available from DIC), YELLOW AP22 (available from Dainichiseika Color & Chemicals Mfg. Co., Ltd.), TONER YELLOW HG (available from Clariant), and FAST YELLOW 4190 and BY2000GT (available from DIC).

Besides the above-described components, the ink of the invention may include conventional additives. Examples of the additives may include a surfactant, such as an anionic, cationic, amphoteric or nonionic surfactant, an antioxidant, such as dibutylhydroxytoluene, propyl gallate, tocopherol, butylhydroxyanisol or nordihydroguaiaretic acid, etc.

The ink of the invention can be prepared, for example, by putting all the components at once or in fractions in a known dispersing device, such as a bead mill, to disperse the components, and filtering them with a known filtering device, such as a membrane filter, as desired.

Examples of the non-aqueous ink of the invention are shown below.

EXAMPLES

Preparation of Carbon Black Sample 1

In an flask provided with a stirrer, a thermometer, a nitrogen gas introducing device and a cooling tube, 10 g of carbon black (MA600 with a particle size of 20 nm, a specific surface area of 140 m$^2$/g (JIS K6217) and a pH of 7, available from Mitsubishi Chemical Corporation), 1 g of KPS (potassium persulfate expressed by $K_2S_2O_8$, available from Wako Pure Chemical Industries, Ltd.) as a surface treating agent, 2 g of DEMOL NL (sodium salt of formalin β-naphthalenesulfonate condensate, available from Kao Corporation) as a pigment dispersant and 100 g of water as a solvent were put.

Then, zirconia beads (2.0 mm φ, 450 g/100 g of reaction mixture) were put in the flask, and nitrogen gas was injected while stirring to replace the atmosphere in the flask with the nitrogen gas. The flask was set in an oil bath set at 105° C., and the mixture in the flask was stirred at 100 rpm in the nitrogen gas atmosphere to react the mixture for six hours. The resulting reaction mixture was filtered to remove the beads, and then, BUTYCENOL (tetraethylene glycol monobutyl ether, available from Kyowa Hakko Chemical Co., Ltd.) of equal mass was added to the remaining reaction mixture and the mixture was stirred. Thereafter, the content of the flask was separated by centrifugation into a solid content and a liquid content.

The separated solid content was dispersed in water and stirred at 70° C. for 12 hours to dissolve the unreacted surface treating agent in water, and then was filtered with a filter to isolate the carbon black. The resulting carbon black was dried at 100° C. for 12 hours. The resulting carbon black was analyzed by FT-IR, and the presence of COOH group and $SO_3K$ group was confirmed. Further, the pH of the pigment washing water was measured according to the JIS standard K5101-17-1 and was found to be 2.3.

Preparation of Ink

Ink samples of Examples and Comparative Examples were prepared by premixing materials according to each composition shown in Tables 1 to 3 below (the numerical values shown in Tables 1 to 3 are in parts by mass) and dispersing the mixture with a retention time of about 12 minutes. It should be noted that the ink sample of Example 5, which is believed to have the highest viscosity among the ink samples of the Examples, had a viscosity of 10.8 mPa·s at 23° C. under 30 Pa, and therefore the ink samples of the Examples can be suitably used as inkjet inks.

Evaluation

Storage Stability

Each of the ink samples of the Examples and the Comparative Examples was put and sealed in a glass bottle and left for one month at room temperature, and then was visually observed and evaluated according to the following criteria:

Good: no agglomeration/sedimentation of the pigment was observed; and

Bad: agglomeration/sedimentation of the pigment was observed.

Print-Through

With respect to the ink samples of the Examples and the Comparative Examples, each of the ink samples subjected to the above-described storage stability test was transferred onto RISO printing paper (thin type) with a bar coater, and the rear side of the printing paper was visually observed and evaluated according to the following criteria (it should be noted that this test was not carried out for the ink samples which were evaluated as "Bad" in the storage stability test):

Excellent: almost no print-through was observed;

Good: only a low level of print-through was observed;

Acceptable: a certain acceptable level of print-through was observed; and

Bad: a significant level of print-through was observed.

The formulation and the results of the evaluations of each ink sample are shown in Tables 1 to 3.

TABLE 1

| | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Pigment | Carbon black sample 1 with pH of 2.3 (black) | 10 | | | | | 10 | | 10 | 10 |
| | MA100 (black) | | | | | 10 | | | | |
| | Cyanine blue KRG (cyan) | | 5 | | | | | | | |
| | Brilliant carmine 6B321 (magenta) | | | 5 | | | | | | |
| | YELLOW AP22 (yellow) | | | | 5 | | | 5 | | |
| | BY2000GT (yellow) | | | | | | | | | |
| Dispersant | SOLSPERSE 28000 (100% polymer component) Lubrizol | | | | | | | | | |
| | SOLSPERSE 20000 (100% polymer component) Lubrizol | | | | | | | | 2 | 0.6 |
| | DISPERBYK 2001 (46% polymer component) BYK-Chemie | | | | | | | | | |

TABLE 1-continued

| | | | | | | | | | | |
|---|---|---|---|---|---|---|---|---|---|---|
| Solvent | Ethylene carbonate | 10 | 10 | 10 | 10 | | 50 | | | |
| | Propylene carbonate | 80 | 85 | 85 | 85 | | 20 | 60 | 88 | 89.4 |
| | 1,2 butylene carbonate | | | | | 90 | 20 | | | |
| | Triethylene glycol monobutyl ether | | | | | | | 35 | | |
| Total | | 100 | 100 | 100 | 100 | 100 | 100 | 100 | 100 | 100 |
| Ratio of five-membered heterocyclic compound relative to the total amount of solvent (mass %) | | 100.0 | 100.0 | 100.0 | 100.0 | 100.0 | 100.0 | 63.2 | 100.0 | 100.0 |
| Ratio of polymer relative to the pigment (mass %) | | 0.0 | 0.0 | 0.0 | 0.0 | 0.0 | 0.0 | 0.0 | 20.0 | 6.0 |
| Evaluation | Storage stability | Good | Good | Good | Good | Good | Good | Good | Good | Good |
| | Print-through | Excellent | Excellent | Good | Excellent | Excellent | Excellent | Good | Acceptable | Good |

| | | Ex. 10 | Ex. 11 | Ex. 12 | Ex. 13 | Ex. 14 | Ex. 15 | Ex. 16 | Ex. 17 |
|---|---|---|---|---|---|---|---|---|---|
| Pigment | Carbon black sample 1 with pH of 2.3 (black) | 10 | 10 | 10 | | | | | |
| | MA100 (black) | | | | | | | | |
| | Cyanine blue KRG (cyan) | | | | 5 | 5 | | | |
| | Brilliant carmine 6B321 (magenta) | | | | | | 5 | | |
| | YELLOW AP22 (yellow) | | | | | | | | |
| | BY2000GT (yellow) | | | | | | | 5 | 5 |
| Dispersant | SOLSPERSE 28000 (100% polymer component) Lubrizol | | | | | | | | |
| | SOLSPERSE 20000 (100% polymer component) Lubrizol | 0.3 | | | | | | | |
| | DISPERBYK 2001 (46% polymer component) BYK-Chemie | | 2 | | | | | | |
| Solvent | Ethylene carbonate | | | | | | | | |
| | Propylene carbonate | 89.7 | 88 | 90 | | 95 | | | 95 |
| | 1,2 butylene carbonate | | | | 95 | | 95 | 95 | |
| | Triethylene glycol monobutyl ether | | | | | | | | |
| Total | | 100 | 100 | 100 | 100 | 100 | 100 | 100 | 100 |
| Ratio of five-membered heterocyclic compound relative to the total amount of solvent (mass %) | | 100.0 | 98.8 | 100.0 | 100.0 | 100.0 | 100.0 | 100.0 | 100.0 |
| Ratio of polymer relative to the pigment (mass %) | | 3.0 | 9.2 | 0.0 | 0.0 | 0.0 | 0.0 | 0.0 | 0.0 |
| Evaluation | Storage stability | Good | Good | Good | Good | Good | Good | Good | Good |
| | Print-through | Good | Acceptable | Good | Good | Good | Good | Good | Good |

TABLE 2

| | | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|---|
| Pigment | Carbon black sample 1 with pH of 2.3 (black) | 10 | 10 | | | | | | 10 | 10 |
| | MA100 (black) | | | | | | | | | |
| | Cyanine blue KRG (cyan) | | | 5 | | | | 5 | | |
| | Brilliant carmine 6B321 (magenta) | | | | 5 | | | | | |
| | YELLOW AP22 (yellow) | | | | | | | | | |
| | BY2000GT (yellow) | | | | | 5 | 5 | | | |
| Dispersant | SOLSPERSE 28000 (100% polymer component) Lubrizol | | | | | | | | | |
| | SOLSPERSE 20000 (100% polymer component) Lubrizol | | | | | | | | | |
| | DISPERBYK 2001 (46% polymer component) BYK-Chemie | | | | | | | | | |

TABLE 2-continued

| Category | Component | | | | | | | | |
|---|---|---|---|---|---|---|---|---|---|
| Solvent | Propylene carbonate | | | | | | | | |
| | γ-butyrolactone | 90 | | 95 | 95 | | 95 | | |
| | α-acetyl-γ-butyrolactone | | 90 | | | 95 | | | |
| | NMP | | | | | | | 95 | 90 |
| | 1,3 dimethyl imidazolidinone | | | | | | | | 90 |
| Total | | 100 | 100 | 100 | 100 | 100 | 100 | 100 | 100 |
| Ratio of five-membered heterocyclic compound relative to the total amount of solvent (mass %) | | 100.0 | 100.0 | 100.0 | 100.0 | 100.0 | 100.0 | 100.0 | 100.0 |
| Ratio of polymer relative to the pigment (mass %) | | 0.0 | 0.0 | 0.0 | 0.0 | 0.0 | 0.0 | 0.0 | 0.0 |
| Evaluation | Storage stability | Good | Good | Good | Good | Good | Good | Good | Good |
| | Print-through | Acceptable | Acceptable | Acceptable | Acceptable | Acceptable | Acceptable | Acceptable | Acceptable |

| | | Ex. 27 | Ex. 28 | Ex. 29 | Ex. 30 | Ex. 31 | Ex. 32 | Ex. 33 | Ex. 34 |
|---|---|---|---|---|---|---|---|---|---|
| Pigment | Carbon black sample 1 with pH of 2.3 (black) | | | | 10 | 10 | 10 | 15 | 15 |
| | MA100 (black) | | | | | | | | |
| | Cyanine blue KRG (cyan) | | | | | | | | |
| | Brilliant carmine 6B321 (magenta) | 5 | | | | | | | |
| | YELLOW AP22 (yellow) | | | | | | | | |
| | BY2000GT (yellow) | | 5 | 5 | | | | | |
| Dispersant | SOLSPERSE 28000 (100% polymer component) Lubrizol | | | | | | | | |
| | SOLSPERSE 20000 (100% polymer component) Lubrizol | | | | | | | | |
| | DISPERBYK 2001 (46% polymer component) BYK-Chemie | | | | | | | | |
| Solvent | Propylene carbonate | | | | 45 | 45 | 45 | 42.5 | 42.5 |
| | γ-butyrolactone | | | | 45 | 45 | | 42.5 | |
| | α-acetyl-γ-butyrolactone | | | | | | | | |
| | NMP | 95 | 95 | | | | | | |
| | 1,3 dimethyl imidazolidinone | | | 95 | | | 45 | | 42.5 |
| Total | | 100 | 100 | 100 | 100 | 100 | 100 | 100 | 100 |
| Ratio of five-membered heterocyclic compound relative to the total amount of solvent (mass %) | | 100.0 | 100.0 | 100.0 | 100.0 | 100.0 | 100.0 | 100.0 | 100.0 |
| Ratio of polymer relative to the pigment (mass %) | | 0.0 | 0.0 | 0.0 | 0.0 | 0.0 | 0.0 | 0.0 | 0.0 |
| Evaluation | Storage stability | Good | Good | Good | Good | Good | Good | Good | Good |
| | Print-through | Acceptable | Acceptable | Acceptable | Acceptable | Acceptable | Acceptable | Acceptable | Acceptable |

TABLE 3

| | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Pigment | Carbon black sample 1 with pH of 2.3 (black) | 10 | 10 | 10 | | 10 | 10 | 10 | 10 |
| | MA100 (black) | | | | 10 | | | | |
| | Cyanine blue 4044 (cyan) | | | | | | | | |
| | Brilliant carmine 6B321 (magenta) | | | | | | | | |
| | YELLOW AP22 (yellow) | | | | | | | | |
| | BY2000GT (yellow) | | | | | | | | |
| Dispersant | SOLSPERSE 28000 (100% polymer component) Lubrizol | | | | 5 | | | | |
| | SOLSPERSE 20000 (100% polymer component) Lubrizol | | 10 | | | | | | |
| | DISPERBYK 2001 (46% polymer component) BYK-Chemie | | | 10 | | | | | |

TABLE 3-continued

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Solvent | Propylene carbonate | 80 | 80 | | | | | | |
|  | Iisopropanol | | | | | 90 | | | |
|  | Dimethyl carbonate | | | | | | 90 | | |
|  | Dioctyl carbonate | | | | | | | 90 | |
|  | Diethylene glycol | | | | | | | | 90 |
|  | Methyl oleate | | | 90 | 85 | | | | |
| Total |  |  |  |  |  | 100 | 100 | 100 | 100 |
| Ratio of five-membered heterocyclic compound relative to the total amount of solvent (mass %) |  | 100.0 | 93.7 | 0.0 | 0.0 | 0.0 | 0.0 | 0.0 | 0.0 |
| Ratio of polymer relative to the pigment (mass %) |  | 100.0 | 46.0 | 0.0 | 50.0 | 0.0 | 0.0 | 0.0 | 0.0 |
| Evaluation | Storage stability | Good | Good | Bad | Good | Bad | Bad | Bad | Bad |
|  | Print-through | Bad | Bad | — | Bad | — | — | — | — |

Table 1 shows Examples where a carbonate compound was used as the five-membered heterocyclic compound. Table 2 shows Examples where a lactone compound, a pyrrolidone compound or an imidazoline compound was used as the five-membered heterocyclic compound, and Examples where one of the lactone compound, the pyrrolidone compound and the imidazoline was used in combination with the carbonate compound as the five-membered heterocyclic compound. Table 3 shows Comparative Examples. As shown in Tables 1 and 2, no agglomeration/sedimentation of the pigment was observed with the ink samples of the invention, and therefore the ink samples of the invention had excellent storage stability even with the significantly lower polymer content than the conventional inks. It should be noted that the carbonate compound was more effective to reduce or eliminate the print-through than the lactone compound, the pyrrolidone compound and the imidazoline compound.

The ink samples of Comparative Examples 1, 2 and 4 were conventional pigment-dispersed non-aqueous inks, where the pigment was dispersed using a dispersant. Although good pigment dispersibility was achieved in Comparative Examples 1, 2 and 4, a significant level of print-through was observed and the print density was low. With the ink sample of Comparative Example 3, which was an ink containing no pigment dispersant, sedimentation of the pigment was observed, and therefore the ink sample of Comparative Example 3 had poor storage stability. In contrast, with respect to the ink samples of the invention, even the ink sample of Example 8, which had the highest polymer content of 20 mass % relative to the pigment, resulted in the print-through in the acceptable range, and therefore provided high print density. Although the solvents used in Comparative Examples 5 to 8 were non-cyclic compounds, sedimentation of the pigment was observed in Comparative Examples 5 to 8, and therefore the storage stability was poor.

As describe above, the ink of the invention can achieve both the pigment dispersion stability and the reduction or elimination of print-through (and the high print density as a result), which are trade-off properties with conventional inks where a polymer is used for dispersing the pigment.

The invention claimed is:

1. A non-aqueous ink comprising
   at least a pigment and an organic solvent, and substantially containing no polymer component,
   wherein said pigment is at least one of an inorganic pigment selected from the group consisting of titanium oxide, colcothar, cobalt blue, ultramarine, iron blue, carbon black, calcium carbonate, kaolin, clay, barium sulfate, talc and/or silica, and/or an organic pigment selected from the group consisting of insoluble azo pigment, azo lake pigment, condensed azo pigment, condensed polycyclic pigment and/or copper phthalocyanine pigment; and
   wherein the organic solvent contains a five-membered heterocyclic compound having a C=O bond in an amount of 50 mass % or more of the organic solvent, and the heterocyclic compound is a carbonate compound.

2. The non-aqueous ink as claimed in claim 1, wherein the carbonate compound is at least one selected from ethylene carbonate, propylene carbonate, 1,2-butylene carbonate and derivatives thereof.

3. The non-aqueous ink as claimed in claim 1, wherein a content of the heterocyclic compound is 60 to 97 mass % relative to the total amount of the ink.

4. A non-aqueous ink comprising
   at least a pigment and an organic solvent, and substantially containing no polymer component,
   wherein the organic solvent contains a five-membered heterocyclic compound having a C=O bond in an amount of 50 mass % or more of the organic solvent, and the heterocyclic compound is a carbonate compound, and
   the pigment is carbon black subjected to an acidic treatment.

5. The non-aqueous ink as claimed in claim 1, wherein the ink is an inkjet ink.

6. The non-aqueous ink as claimed in claim 2, wherein a content of the heterocyclic compound is 60 to 97 mass % relative to the total amount of the ink.

7. A non-aqueous ink comprising
   at least a pigment and an organic solvent, and substantially containing no polymer component,
   wherein the organic solvent contains a five-membered heterocyclic compound having a C=O bond in an amount of 50 mass % or more of the organic solvent, and the heterocyclic compound is a carbonate compound, the carbonate compound is at least one selected from ethylene carbonate, propylene carbonate, 1,2-butylene carbonate and derivatives thereof, and
   the pigment is carbon black subjected to an acidic treatment.

8. The non-aqueous ink as claimed in claim 2, wherein the ink is an inkjet ink.

9. A non-aqueous ink comprising
   at least a pigment and an organic solvent, and substantially containing no polymer component, wherein the organic solvent contains a five-membered heterocyclic compound having a C═O bond in an amount of 50 mass % or more of the organic solvent, and the heterocyclic compound is a carbonate compound, a content of the heterocyclic compound is 60 to 97 mass % relative to the total amount of the ink, and the pigment is carbon black subjected to an acidic treatment.

10. The non-aqueous ink as claimed in claim 3, wherein the ink is an inkjet ink.

11. The non-aqueous ink as claimed in claim 4, wherein the ink is an inkjet ink.

\* \* \* \* \*